United States Patent
Aggarwal et al.

(10) Patent No.: US 11,914,641 B2
(45) Date of Patent: Feb. 27, 2024

(54) TEXT TO COLOR PALETTE GENERATOR

(71) Applicant: ADOBE INC., San Jose, CA (US)

(72) Inventors: Pranav Aggarwal, San Jose, CA (US); Ajinkya Kale, San Jose, CA (US); Baldo Faieta, San Francisco, CA (US); Saeid Motiian, San Francisco, CA (US); Venkata naveen kumar yadav Marri, San Jose, CA (US)

(73) Assignee: ADOBE INC., San Jose, CA (US)

( * ) Notice: Subject to any disclaimer, the term of this patent is extended or adjusted under 35 U.S.C. 154(b) by 96 days.

(21) Appl. No.: 17/186,625

(22) Filed: Feb. 26, 2021

(65) Prior Publication Data

US 2022/0277039 A1    Sep. 1, 2022

(51) Int. Cl.

| | |
|---|---|
| *G06F 16/583* | (2019.01) |
| *G06F 40/279* | (2020.01) |
| *G06N 3/08* | (2023.01) |
| *G06F 16/51* | (2019.01) |
| *G06F 16/538* | (2019.01) |
| *G06F 16/532* | (2019.01) |
| *G06V 10/56* | (2022.01) |

(52) U.S. Cl.
CPC .......... *G06F 16/5838* (2019.01); *G06F 16/51* (2019.01); *G06F 16/532* (2019.01); *G06F 16/538* (2019.01); *G06F 40/279* (2020.01); *G06N 3/08* (2013.01); *G06V 10/56* (2022.01)

(58) Field of Classification Search
CPC .... G06F 16/5838; G06F 16/51; G06F 16/532; G06F 16/538; G06N 3/08
See application file for complete search history.

(56) References Cited

U.S. PATENT DOCUMENTS

| 11,615,567 B2 | 3/2023 | Harikumar et al. | |
|---|---|---|---|
| 2012/0092359 A1* | 4/2012 | O'Brien-Strain | .... H04N 1/6041 |
| | | | 345/589 |

(Continued)

OTHER PUBLICATIONS

Artetxe, et al., "Massively Multilingual Sentence Embeddings for Zero-Shot Cross-Lingual Transfer and Beyond", arXiv:1812.10464v2 [cs.CL] Sep. 25, 2019, 14 pages.

(Continued)

*Primary Examiner* — Richard L Bowen
*Assistant Examiner* — Aryan D Toughiry
(74) *Attorney, Agent, or Firm* — F. CHAU & ASSOCIATES, LLC

(57) ABSTRACT

The present disclosure describes systems and methods for information retrieval. Embodiments of the disclosure provide a color embedding network trained using machine learning techniques to generate embedded color representations for color terms included in a text search query. For example, techniques described herein are used to represent color text in a same space as color embeddings (e.g., an embedding space created by determining a histogram of LAB based colors in a three-dimensional (3D) space). Further, techniques are described for indexing color palettes for all the searchable images in the search space. Accordingly, color terms in a text query are directly converted into a color palette and an image search system can return one or more search images with corresponding color palettes that are relevant to (e.g., within a threshold distance from) the color palette of the text query.

20 Claims, 9 Drawing Sheets

(56) References Cited

U.S. PATENT DOCUMENTS

| | | | |
|---|---|---|---|
| 2015/0104183 A1 | 4/2015 | Cesnik | |
| 2015/0324392 A1* | 11/2015 | Becker | G06F 16/24578 |
| | | | 707/706 |
| 2016/0140519 A1* | 5/2016 | Trepca | G06N 7/005 |
| | | | 705/26.44 |
| 2019/0258671 A1 | 8/2019 | Bou et al. | |
| 2019/0294641 A1* | 9/2019 | Alexeev | G06F 16/951 |
| 2020/0342328 A1 | 10/2020 | Revaud et al. | |
| 2020/0380027 A1 | 12/2020 | Aggarwal et al. | |
| 2020/0380298 A1* | 12/2020 | Aggarwal | G06N 3/0454 |
| 2020/0380403 A1 | 12/2020 | Aggarwal et al. | |
| 2021/0089827 A1* | 3/2021 | Kumagai | G06T 7/00 |
| 2021/0103969 A1 | 4/2021 | Sollami et al. | |
| 2021/0383067 A1 | 12/2021 | Reisswig | |
| 2022/0108169 A1 | 4/2022 | Saha et al. | |

OTHER PUBLICATIONS

Yang, et al., "Multilingual Universal Sentence Encoder for Semantic Retrieval",2019, arXiv preprint arXiv:1907.04307v1 [cs.CL] Jul. 9, 2019, 6 pages.

Related to U.S. Appl. No. 16/561,973, filed Sep. 5, 2019, entitled: Multi-Resolution Color-Based Image Search.

Related to U.S. Appl. No. 17/075,450, filed Oct. 20, 2020, entitled: Generating Embeddings In A Multimodal Embedding Space For Cross-Lingual Digital Image Retrieval.

Notice of Allowance dated May 23, 2023, in corresponding U.S. Appl. No. 17/240,030.

Office Action dated Jan. 5, 2024 in corresponding U.S. Appl. No. 17/453,595.

* cited by examiner

TEXT TO COLOR PALETTE GENERATOR

BACKGROUND

The following relates generally to information retrieval, and more specifically to a text to color palette generator.

Information retrieval refers to the task of extracting information resources based on a query. In some cases, information retrieval includes identifying relevant search objects from a database and comparing the search objects to a query object. For example, a user may provide a text description or an image as a query, and a search engine may find images that are similar or relevant to the query.

In some cases, a user may use an image search system to perform a color-based image search that returns relevant search objects (e.g., relevant images) from a database that include colors corresponding to a query (e.g., such as a text query). Color-based image searches may be performed for various reasons, such as to obtain images that include certain colors, to obtain images that fit a color theme, to obtain images that fit design or branding guidelines, etc. Image search systems may determine images that have colors that are similar to a query object (e.g., query text) in a variety of ways. Recently, image search systems have used image tagging (e.g., tagging of searchable images with meta data) and a lookup dictionary in a search indexing pipeline. These image search systems may rely on a lookup dictionary of a finite number of colors such that limited color text in a query is able to be converted to a corresponding color palette used to search image meta data (e.g., to retrieve search images with meta data relevant to the color palette).

However, searchable images may not be tagged with complex or accurate colors in the search indexing pipeline. For instance, tagging searchable images with more complex and/or more numerous color descriptors may be time consuming, may result in more computationally expensive lookup procedures, and therefore may be difficult to scale. Accordingly, search based approaches typically have a finite set of colors in a lookup dictionary, which may reduce accuracy of retrieved search results when more complex colors are desired, when colors are misspelled in a query, when queries include colors or words in languages other than the lookup dictionary and metadata language, etc. Therefore, there is a need in the art for improved image search systems that are capable of more complex color search operations and that are scalable to large datasets.

SUMMARY

The present disclosure describes systems and methods for information retrieval. Embodiments of the disclosure provide a color embedding network trained using machine learning techniques to generate embedded color representations for color terms included in a text search query. For example, techniques described herein are used to represent color text in a same space as color embeddings (e.g., an embedding space created by determining a histogram of LAB based colors in a three-dimensional (3D) space). Further, techniques are described for indexing color palettes for searchable images in the search space. Accordingly, color terms in a text query may be directly converted into a color palette and an image search system can return one or more search images with corresponding color palettes that are relevant to (e.g., within a threshold distance from) the color palette of the text query.

A method, apparatus, non-transitory computer readable medium, and system for a text to color palette generator are described. Embodiments of the method, apparatus, non-transitory computer readable medium, and system are configured to receive a text query including a color term and generate an embedded color representation for the color term using a color embedding network, where individual values of the embedded color representation correspond to one or more colors in a color space. Embodiments of the method, apparatus, non-transitory computer readable medium, and system are further configured to identify a subset of the individual values of the embedded color representation and select a color palette for the text query by selecting colors corresponding to the subset of the individual values of the embedded color representation.

An apparatus, system, and method including a text to color palette generator are described. Embodiments of the apparatus, system, and method include a text encoder trained to embed color terms in a text embedding space to generate embedded color terms, a color embedding network trained to generate embedded color representations for the color terms based on the embedded color terms, where individual values of the embedded color representations correspond to one or more colors in a color space, and a palette selector configured to select a color palette comprising a plurality of colors corresponding to the individual values of the embedded color representation.

A method, apparatus, non-transitory computer readable medium, and system for a text to color palette generator are described. Embodiments of the method, apparatus, non-transitory computer readable medium, and system are configured to generate an embedded color representation for a color term using a color embedding network, where individual values of the embedded color representation correspond to one or more colors in a color space. Embodiments of the method, apparatus, non-transitory computer readable medium, and system are further configured to identify a positive color representation corresponding to the color term, identify a negative color representation that does not correspond to the color term, compute a metric learning loss based on the embedded color representation, the positive color representation, and the negative color representation, and train the color embedding network based on the metric learning loss.

DETAILED DESCRIPTION

Figure 1:
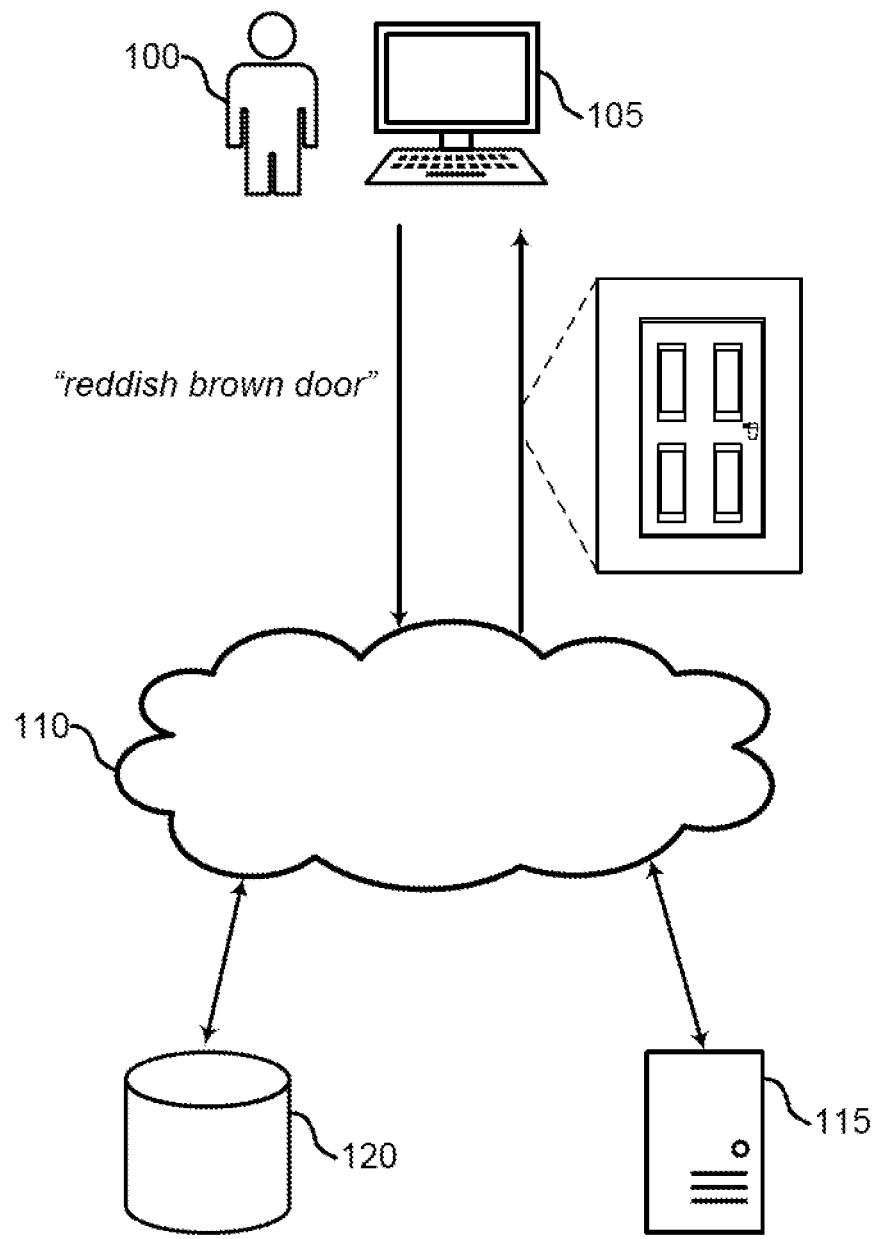
FIG. 1 shows an example of a text-based image search system according to aspects of the present disclosure.

The present disclosure describes systems and methods for information retrieval based on color. Embodiments of the disclosure provide a color embedding network trained using machine learning techniques to generate embedded color representations for color terms (e.g., color terms included in a text search query). For example, techniques described herein are used to represent color text in a same space as color embeddings. Accordingly, color terms in a text query are directly converted into a color palette and an image search system can return one or more search images with corresponding color palettes that are relevant to the color palette of the text query.

Information retrieval systems (i.e., image search systems) have used image tagging (e.g., tagging of searchable images with meta data) and a lookup dictionary to retrieve searchable images that are tagged with metadata that matches (or corresponds to) search query text. Because these lookup dictionaries include a finite number of colors, limited color text in a query is able to be converted to a corresponding color palette. To increase the complexity of color palettes that may be searched via a search query, image tagging may be increased, and lookup dictionaries may be expanded. However, such tagging and resulting searching places a heavy demand on storage and computation resources. As a result, these systems are not scalable and cannot accurately retrieve results for queries include complex and/or more numerous color descriptors.

Embodiments of the present disclosure provide improved information retrieval systems that represent query objects (e.g., color descriptors in query text) and search objects (e.g., search images) as a vectors in a color embedding space. The vector representations may capture attributes such as color information, meta-data, or classification tags. For example, an information retrieval system, such as an image search system, can retrieve images by comparing a color palette representation of the text query (in the color embedding space) to indexed color palettes of the searchable images in a database.

By applying the unconventional step of embedding color terms (e.g., color descriptors in a text query) in a color embedding space and selecting a color palette based on the embedded color representation, a color palette corresponding to the searched color terms can be used to efficiently search indexed color palettes of the searchable images. This enables accurate color-based search (e.g., relevant image search results) for search queries including more complex color terms, misspelled color terms, color terms in different languages, etc.

In some examples, training data is created by taking a database of color terms associated with a color space (e.g., color terms and associated RGB values). Training images may be generated by creating images that include the RGB values. In one embodiment, the color images created include a single color and no other features. In other embodiments, multiple colors per training image may be used, or the colors may be applied to existing images with other features (i.e., shapes or varying levels of brightness). The resulting image set may be used for training a color embedding network.

Embodiments of the present disclosure may be used in the context of a search engine (e.g., an image search system). For example, a color embedding network based on the present disclosure may generate embedded color representations based on embedded color terms, and a palette selector may select a color palette based on the generates embedded color representations (e.g., such that the color palette corresponding to color terms in a search query can be efficiently used to search a database of indexed color palettes associated with searchable images). An example of an application of the inventive concept in the image search context is provided with reference to FIGS. 1 and 2. Details regarding the architecture of an example embedding network are provided with reference to FIGS. 3 and 4. Example processes for color palette selection are provided with reference to FIGS. 5 and 6. A description of example training processes are described with reference to FIGS. 7 through 9.

Image Search Application

FIG. 1 shows an example of a text-based image search system according to aspects of the present disclosure. The example shown includes user 100, device 105, cloud 110, image search system 115, and database 120. In some examples, image search system 115 is an example of, or includes aspects of, an apparatus 300 described with reference to FIG. 3. Database 120 is an example of, or includes aspects of, the corresponding element described with reference to FIG. 3.

In the example of FIG. 1, the query is a natural language query (e.g., "reddish brown door") and the search objects are images. However, other types of queries and search objects may be used. In some examples, the query is of a same media type than the search objects. In other examples, the query is of a different media type than the search objects. Generally, the queries and the search objects can include any combination of media types, such as audio files, video files, image files, text files, etc.

The user 100 communicates with the image search system 115 via the user device 105 and the cloud 110. For example, the user 100 may provide a query object such as a text query or an image query. In the example illustrated in FIG. 1, the query object includes a natural language query (e.g., a text query including one or more color terms). The user device 105 transmits the search query to the image search system 115 to find related objects or information (i.e., search objects stored within the database 120). In some embodiments, user device 105 transmits the search query to the image search system 115 to find images with color palettes relevant to a color palette selected based on the search query. In some examples, the user device 105 communicates with the image search system 115 via the cloud 110.

The image search system 115 generates an embedded color representation for color terms in a search query and selects a color palette based on the embedded color representation (e.g., a color palette that includes colors corresponding to individual values of the embedded color representation is selected). The color palette selected for the color terms in the search query is then compared to indexed color palettes of search objects (e.g., searchable images) stored in database 120. In some embodiments, database 120 returns one or more images with color palettes relevant to the search query (e.g., based on a distances in the color embedding space).

The user device 105 may be a personal computer, laptop computer, mainframe computer, palmtop computer, personal assistant, mobile device, or any other suitable processing apparatus.

The image search system 115 may also include a processor unit, a memory unit, a user interface, and a training component. The training component is used to train the encoder of the image search system 115. Additionally, the image search system 115 can communicate with the database 120 via the cloud 115. In some cases, the architecture of the image search system 115 is also referred to as a retrieval aware embedding (RAE) model. Further detail regarding the architecture of the image search system 115 is provided with reference to FIGS. 3 and 4. Further details regarding the operation of the image search system 115 is provided with reference to FIGS. 5 and 6.

In some cases, the image search system 115 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

In some embodiments, the image search system 115 includes or implements aspects of an artificial neural network. An artificial neural network is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmit the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, deep learning techniques may be used to map information or content into a multi-dimensional embedding space. The embedding space provides representation that is independent of content type or language. This kind of representation may blur the lines of content types or input modalities or language modalities for information retrieval.

A cloud 110 is a computer network configured to provide on-demand availability of computer system resources, such as data storage and computing power. In some examples, the cloud 110 provides resources without active management by the user 100. The term cloud 110 is sometimes used to describe data centers available to many users 100 over the Internet. Some large cloud networks have functions distributed over multiple locations from central servers. A server is designated an edge server if it has a direct or close connection to a user 100. In some cases, a cloud 110 is limited to a single organization. In other examples, the cloud 110 is available to many organizations. In one example, a cloud 110 includes a multi-layer communications network comprising multiple edge routers and core routers. In another example, a cloud 110 is based on a local collection of switches in a single physical location.

The database 120 stores the media objects and the respective color palettes for each of the media objects (e.g., database 120 may store searchable images and may index respective color palettes for each of the searchable images). In some examples, one or more of the stored media objects are retrieved from the database 120 as a result of a search by the information retrieval network 110.

A database 120 is an organized collection of data. For example, a database 120 stores data in a specified format known as a schema. A database 120 may be structured as a single database, a distributed database, multiple distributed databases, or an emergency backup database. In some cases, a database controller may manage data storage and processing in a database 120. In some cases, a user 100 interacts with database controller. In other cases, database controller may operate automatically without user interaction. In some examples, the database 120 includes a set of media objects (e.g., image files). According to some embodiments, database 120 includes a plurality of images indexed for an image search. In some examples, database 120 stores indexed color palettes corresponding to the plurality of images. In some examples, database 120 stores embedded color representations corresponding to the plurality of images.

As described herein, a color embedding space can be created by determining a histogram of LAB based colors in a three-dimensional (3D) space. For example, a search object (e.g., a searchable image) can be converted to its corresponding color palette by first converting its pixels into its corresponding LAB space and then using a histogram approach to convert the search object representation into the 1504 sized color embedding. To compute histograms in LAB space, in some examples, a combination of histograms of sizes "[9, 7, 8]" and "[10, 10, 10]" may be used. For instance, two histograms can be calculated using "[9, 7, 8]" and "[10, 10, 10]" intervals and the histograms can be concatenated resulting in one feature vector. According to some embodiments, the square root of each number in the feature vector can be taken to get the final color embedding (e.g., taking the square root can penalize the dominant color and give other colors in the image more weights).

For instance, an image search system 115 can determine a color vector for a search objects based on a multi-resolution color histogram of the search objects. The image search system 115 can determine the multi-resolution color histogram by concatenating two histograms having different resolutions (e.g., numbers of bins). In one example, the image search system determines a first color histogram and a second color histogram as respective 3D histograms with different numbers of bins from one another in a LAB color space. For instance, the first color histogram (e.g., a histogram of size "[9, 7, 8]") can include different numbers of bins in each of the dimensions of the LAB color space, such as nine bins in the L dimension, seven bins in the A dimension, and eight bins in the B dimension, and the second color histogram (e.g., a histogram of size "[10, 10, 10]") can include a same number of bins in each of the dimensions of the LAB color space that is different than the numbers of bins of the first color histogram, such as ten bins in each of the L dimension, the A dimension, and the B dimension. In some examples, to generate a multi-resolution color histogram that represents the color distribution of the search objects, the image search system 115 can concatenate the contents of the first color histogram and the second color histogram.

In some examples, an RGB value can be converted to its corresponding 1504 dimension color embedding, resulting in two non-zeros values in the feature vector (e.g., as only one value in both the color histograms of size 504 and size 1000 are non-zero). Prior to performing the search, the retrieval network 110 may be trained and then used to embed the search objects and query objects in a common embedding space in which each of the search objects are represented in a color embedding.

For example, to determine search objects (e.g., search images) that have a similar color palette as the color terms in the query text, the image search system 115 can be implemented to compute distance measures between the color palette of the color terms in the query text and the color palettes of candidate search objects (e.g., such as stock images in a database 120). In one example, the database 120 includes stock images and color vectors (e.g., and indexed color palettes) of the stock images. The image search system 115 can obtain the indexed color palettes of the stock images and determine distance measures as L2-norms between the color palette of the color terms in the query text and color palettes of the stock images. The distance measures can indicate color similarity (e.g., or relevancy) of candidate search objects (e.g., the stock images or searchable images) to the color terms in the query text.

Figure 2:
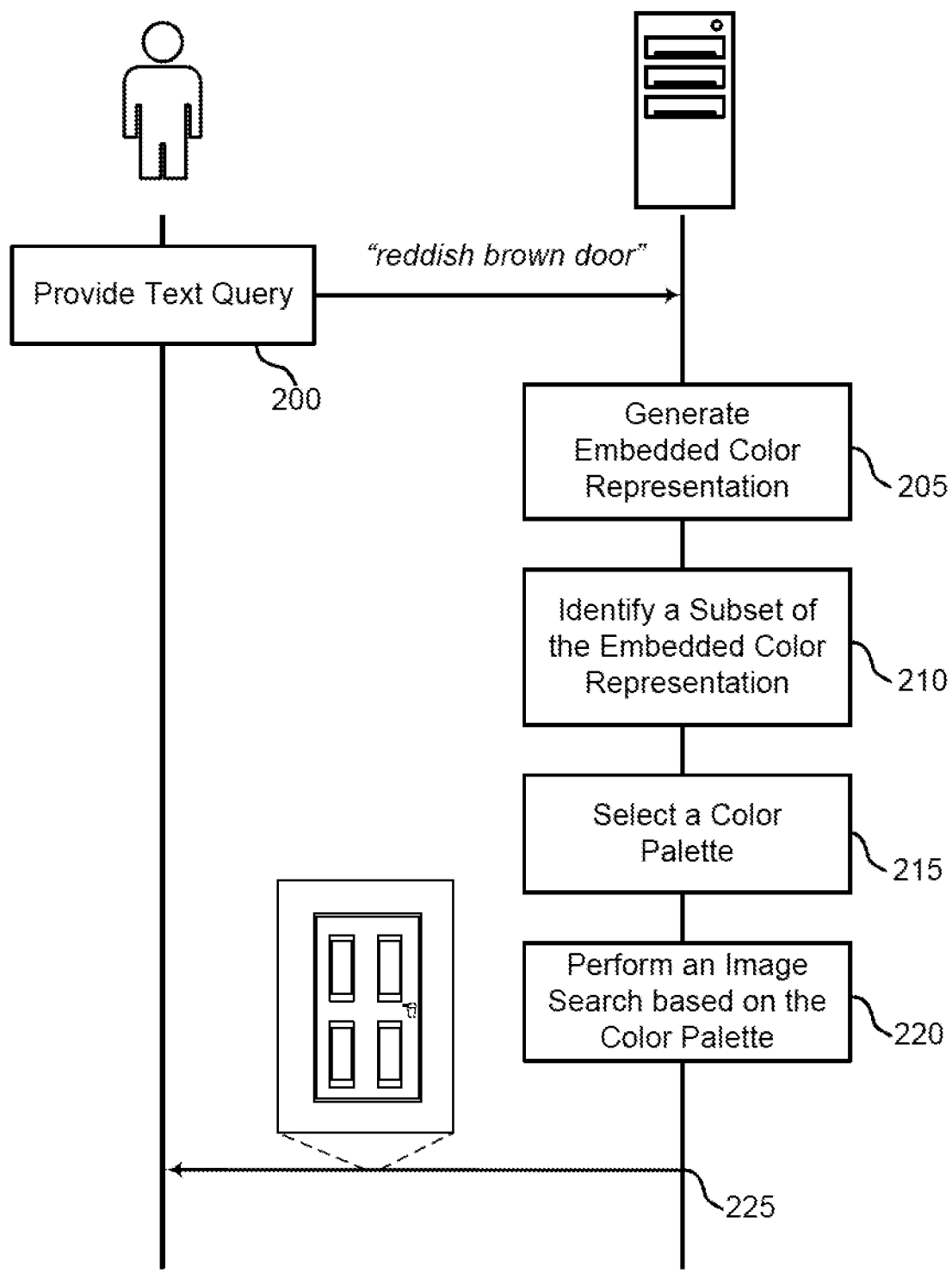
FIG. 2 shows an example of a process for a text-based image search according to aspects of the present disclosure.

FIG. 2 shows an example of a process for a text-based image search according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for a text to color palette generator is described. Embodiments of the method are configured to receive a text query including a color term and generate an embedded color representation for the color term using a color embedding network, where individual values of the embedded color representation correspond to one or more colors in a color space. Embodiments of the method are further configured to identify a subset of the individual values of the embedded color representation and select a color palette for the text query by selecting colors corresponding to the subset of the individual values of the embedded color representation.

At operation 200, the system receives a text query including a color term. In some cases, the operations of this step refer to, or may be performed by, a search interface as described with reference to FIG. 3.

At operation 205, the system generates an embedded color representation for the color term using a color embedding network, where individual values of the embedded color representation correspond to one or more colors in a color space. In some cases, the operations of this step refer to, or may be performed by, a text encoder as described with reference to FIG. 3.

At operation 210, the system identifies a subset of the individual values of the embedded color representation. In some cases, the operations of this step refer to, or may be performed by, a color embedding network as described with reference to FIGS. 3, 4, and 9.

At operation 215, the system selects a color palette for the text query by selecting colors corresponding to the subset of the individual values of the embedded color representation.

In some cases, the operations of this step refer to, or may be performed by, a palette selector as described with reference to FIG. 3.

At operation 220, the system performs an image search based on the color palette. In some cases, the operations of this step refer to, or may be performed by, a color embedding network as described with reference to FIGS. 3, 4, and 9.

At operation 225, the system returns search results based on the color palette. In some cases, the operations of this step refer to, or may be performed by, a color embedding network as described with reference to FIGS. 3, 4, and 9.

An apparatus for a text-based image search is described. The apparatus includes a processor, memory in electronic communication with the processor, and instructions stored in the memory. The instructions are operable to cause the processor to receive a text query including a color term, generate an embedded color representation for the color term using a color embedding network, where individual values of the embedded color representation correspond to one or more colors in a color space, identify a subset of the individual values of the embedded color representation, and select a color palette for the text query by selecting colors corresponding to the subset of the individual values of the embedded color representation.

A non-transitory computer readable medium storing code for a text-based image search is described. In some examples, the code comprises instructions executable by a processor to receive a text query including a color term, generate an embedded color representation for the color term using a color embedding network, where individual values of the embedded color representation correspond to one or more colors in a color space, identify a subset of the individual values of the embedded color representation, and select a color palette for the text query by selecting colors corresponding to the subset of the individual values of the embedded color representation.

A system for a text to color palette generator is described. Embodiments of the system are configured to receive a text query including a color term, generate an embedded color representation for the color term using a color embedding network, where individual values of the embedded color representation correspond to one or more colors in a color space, identify a subset of the individual values of the embedded color representation, and select a color palette for the text query by selecting colors corresponding to the subset of the individual values of the embedded color representation.

Some examples of the method, apparatus, non-transitory computer readable medium, and system described above further include identifying a number of colors for the color palette. Some examples further include selecting a number of highest values of the embedded color representation less than or equal to the number of colors for the color palette, wherein the subset is selected based on the selected number of highest values.

Some examples of the method, apparatus, non-transitory computer readable medium, and system described above further include identifying a value threshold for the embedded color representation. Some examples further include setting all values of the embedded color representation that are less than the value threshold to zero, wherein the number of colors for the color palette is less than or equal to a number of non-zero values of the embedded color representation.

Some examples of the method, apparatus, non-transitory computer readable medium, and system described above further include identifying a first portion of the embedded color representation corresponding to a first color bin size. Some examples further include identifying a second portion of the embedded color representation corresponding to a second color bin size. Some examples further include normalizing the first portion and the second portion independently.

Some examples of the method, apparatus, non-transitory computer readable medium, and system described above further include identifying an additional color term in the text query. Some examples further include generating an additional embedded color representation for the additional color term, wherein the color palette is selected based on the embedded color representation and the additional embedded color representation.

Some examples of the method, apparatus, non-transitory computer readable medium, and system described above further include performing an image search based on the color palette. Some examples of the method, apparatus, non-transitory computer readable medium, and system described above further include determining that the color term is directed to a foreground or a background, wherein the image search is based on the determination. Some examples of the method, apparatus, non-transitory computer readable medium, and system described above further include generating a mask for the foreground or the background based on the determination, wherein the image search is based on the mask.

Some examples of the method, apparatus, non-transitory computer readable medium, and system described above further include identifying an additional color term in the text query, wherein the color term is directed to the foreground and the additional color term is directed to the background, and wherein the image search is directed to images having colors from the color palette in the foreground and colors corresponding to the additional color term in the background. Some examples of the method, apparatus, non-transitory computer readable medium, and system described above further include embedding the color term in a text embedding space to produce an embedded color term. Some examples further include converting the embedding color term into a color embedding space to produce the embedded color representation. In some examples, the color term comprises a base color and a color modifier.

Figure 3:
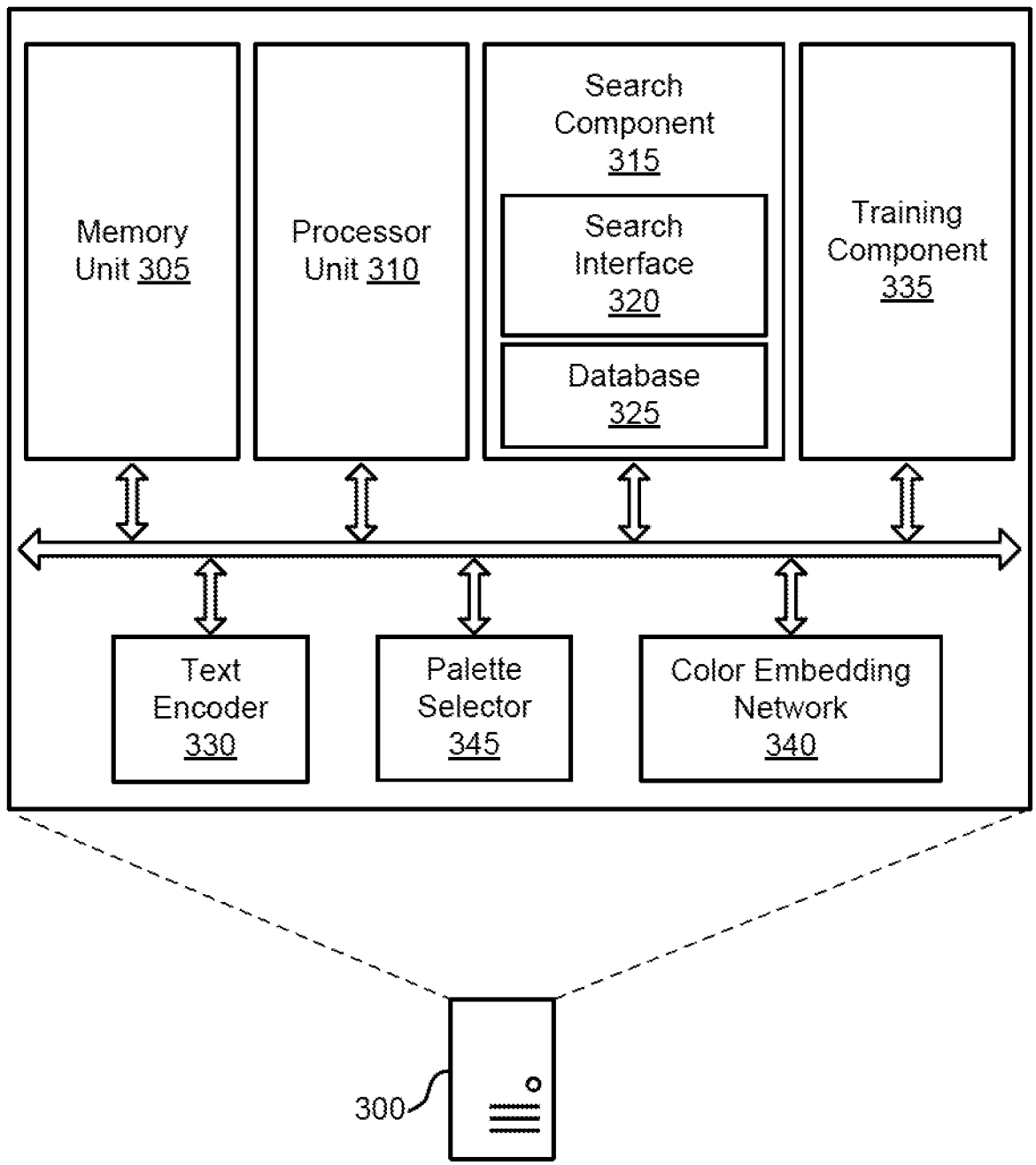
FIG. 3 shows an example of a text-based image search apparatus according to aspects of the present disclosure.

FIG. 3 shows an example of a text-based image search apparatus 300 according to aspects of the present disclosure. In one embodiment, apparatus 300 includes memory unit 305, processor unit 310, search component 315, text encoder 330, training component 335, color embedding network 340, and palette selector 345.

An apparatus 300 (e.g., a text to color palette generator) is described. Embodiments of the apparatus 300 include a text encoder 330 trained to embed color terms in a text embedding space to generate embedded color terms, a color embedding network 340 trained to generate embedded color representations for the color terms based on the embedded color terms, wherein individual values of the embedded color representations correspond to one or more colors in a color space, and a palette selector 345 configured to select a color palette comprising a plurality of colors corresponding to the individual values of the embedded color representation.

Examples of a memory unit 305 include random access memory (RAM), read-only memory (ROM), or a hard disk. Examples of memory units 305 include solid state memory and a hard disk drive. In some examples, memory unit 305 is used to store computer-readable, computer-executable software including instructions that, when executed, cause a processor to perform various functions described herein. In some cases, the memory unit 305 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

A processor unit 310 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 310 is configured to operate a memory array using a memory controller. In other cases, a memory controller is integrated into the processor unit 310. In some cases, the processor unit 310 is configured to execute computer-readable instructions stored in a memory to perform various functions. In some embodiments, a processor unit 310 includes special purpose components for modem processing, baseband processing, digital signal processing, or transmission processing.

According to some embodiments, search component 315 performs an image search based on the color palette. In some examples, search component 315 determines that the color term is directed to a foreground or a background, where the image search is based on the determination. In some examples, search component 315 generates a mask for the foreground or the background based on the determination, where the image search is based on the mask. In some examples, search component 315 identifies an additional color term in the text query, where the color term is directed to the foreground and the additional color term is directed to the background, and where the image search is directed to images having colors from the color palette in the foreground and colors corresponding to the additional color term in the background. According to some embodiments, search component 315 may be configured to perform an image search based on the color palette.

In one embodiment, search component 315 includes search interface 320 and database 325. According to some embodiments, search interface 320 receives a text query including a color term. According to some embodiments, search interface 320 may be configured to receive a text query from a user and display search results based on the image search. Database 325 is an example of, or includes aspects of, the corresponding element described with reference to FIG. 1.

According to some embodiments, text encoder 330 generates an embedded color representation for the color term using a color embedding network 340, where individual values of the embedded color representation correspond to one or more colors in a color space.

According to some embodiments, training component 335 may be configured to train the color embedding network 340 using single color image files associated with color terms. According to some embodiments, training component 335 generates an embedded color representation for a color term using a color embedding network 340, where individual values of the embedded color representation correspond to one or more colors in a color space. In some examples, training component 335 identifies a positive color representation corresponding to the color term and a negative color representation that does not correspond to the color term. In some examples, training component 335 computes a metric learning loss based on the embedded color representation, the positive color representation, and the negative color representation. In some examples, training component 335 trains the color embedding network 340 based on the metric learning loss. In some examples, the metric learning loss includes a positive aware triplet ranking loss. In some examples, training component 335 receives training data including a set of color terms and a set of color values in the color space that correspond to the color terms. In some examples, training component 335 generates color images corresponding to the color terms based on the color values, where the color embedding network 340 is trained based on the color images.

According to some embodiments, color embedding network 340 identifies a subset of the individual values of the embedded color representation. In some examples, color embedding network 340 identifies a number of colors for the color palette. In some examples, color embedding network 340 selects a number of highest values of the embedded color representation less than or equal to the number of colors for the color palette, where the subset is selected based on the selected number of highest values. In some examples, color embedding network 340 identifies a value threshold for the embedded color representation. In some examples, color embedding network 340 sets all values of the embedded color representation that are less than the value threshold to zero, where the number of colors for the color palette is less than or equal to a number of non-zero values of the embedded color representation.

In some examples, color embedding network 340 identifies a first portion of the embedded color representation corresponding to a first color bin size. In some examples, color embedding network 340 identifies a second portion of the embedded color representation corresponding to a second color bin size. In some examples, color embedding network 340 normalizes the first portion and the second portion independently. In some examples, color embedding network 340 identifies an additional color term in the text query. In some examples, color embedding network 340 generates an additional embedded color representation for the additional color term, where the color palette is selected based on the embedded color representation and the additional embedded color representation. In some examples, color embedding network 340 converts the embedding color term into a color embedding space to produce the embedded color representation. In some examples, the color term includes a base color and a color modifier.

According to some embodiments, color embedding network 340 may be trained to generate embedded color representations for the color terms based on the embedded color terms, wherein individual values of the embedded color representations correspond to one or more colors in a color space. In some examples, the color embedding network 340 includes a fully connected layer, a ReLU layer, and an L2 normalization layer. Color embedding network 340 is an example of, or includes aspects of, the corresponding element described with reference to FIGS. 4 and 9.

A fully connected neural network includes a series of fully connected layers. A fully connected layer is a function in which each output dimension depends on each input dimension. In a neural network, an activation function may be used to transforming summed weighted inputs from a node into the activation of the node or an output. A ReLU layer may implement a rectified linear activation function, which comprises a piecewise linear function that outputs the input directly if is positive, otherwise, it outputs zero. A rectified linear activation function may be used as a default activation function for many types of neural networks. Using a rectified linear activation function may enable the use of stochastic gradient descent with backpropagation of errors to train deep neural networks. The rectified linear activation function may operate similar to a linear function, but it may enable complex relationships in the data to be learned. The rectified linear activation function may also provide more sensitivity to the activation sum input to avoid saturation. A node or unit that implements a rectified linear activation function may be referred to as a rectified linear activation unit, or ReLU for short. Networks that use a rectifier function for hidden layers may be referred to as rectified networks.

According to some embodiments, palette selector 345 selects a color palette for the text query by selecting colors corresponding to the subset of the individual values of the embedded color representation. According to some embodiments, palette selector 345 may be configured to select a color palette comprising a plurality of colors corresponding to the individual values of the embedded color representation.

In some examples, apparatus 300 may include a user interface. A user interface may enable a user to interact with a device. In some embodiments, the user interface may include an audio device, such as an external speaker system, an external display device such as a display screen, or an input device (e.g., remote control device interfaced with the user interface directly or through an input/output (I/O) controller module). In some cases, a user interface may be a graphical user interface (GUI).

A system for a text-based image search, the system includes a text encoder trained to embed color terms in a text embedding space to generate embedded color terms, a color embedding network trained to generate embedded color representations for the color terms based on the embedded color terms, wherein individual values of the embedded color representations correspond to one or more colors in a color space, and a palette selector configured to select a color palette comprising a plurality of colors corresponding to the individual values of the embedded color representation.

A method of manufacturing an apparatus for a text-based image search is described. The method manufactures a text encoder trained to embed color terms in a text embedding space to generate embedded color terms, a color embedding network trained to generate embedded color representations for the color terms based on the embedded color terms, wherein individual values of the embedded color representations correspond to one or more colors in a color space, and a palette selector configured to select a color palette comprising a plurality of colors corresponding to the individual values of the embedded color representation.

A method of using an apparatus for a text-based image search is described. The method uses using a text encoder trained to embed color terms in a text embedding space to generate embedded color terms and using a color embedding network trained to generate embedded color representations for the color terms based on the embedded color terms, wherein individual values of the embedded color representations correspond to one or more colors in a color space. The method further includes using a palette selector configured to select a color palette comprising a plurality of colors corresponding to the individual values of the embedded color representation.

Some examples of the apparatus, system, and method described above further include a search component configured to perform an image search based on the color palette. Some examples of the apparatus, system, and method described above further include a database comprising a plurality of images indexed for the image search. Some examples of the apparatus, system, and method described above further include a search interface configured to receive a text query from a user and display search results based on the image search. Some examples of the apparatus, system, and method described above further include a training component configured to train the color embedding network using single color image files associated with color terms. In some examples, the color embedding network comprises a fully connected layer, a ReLU layer, and an L2 normalization layer.

Figure 4:
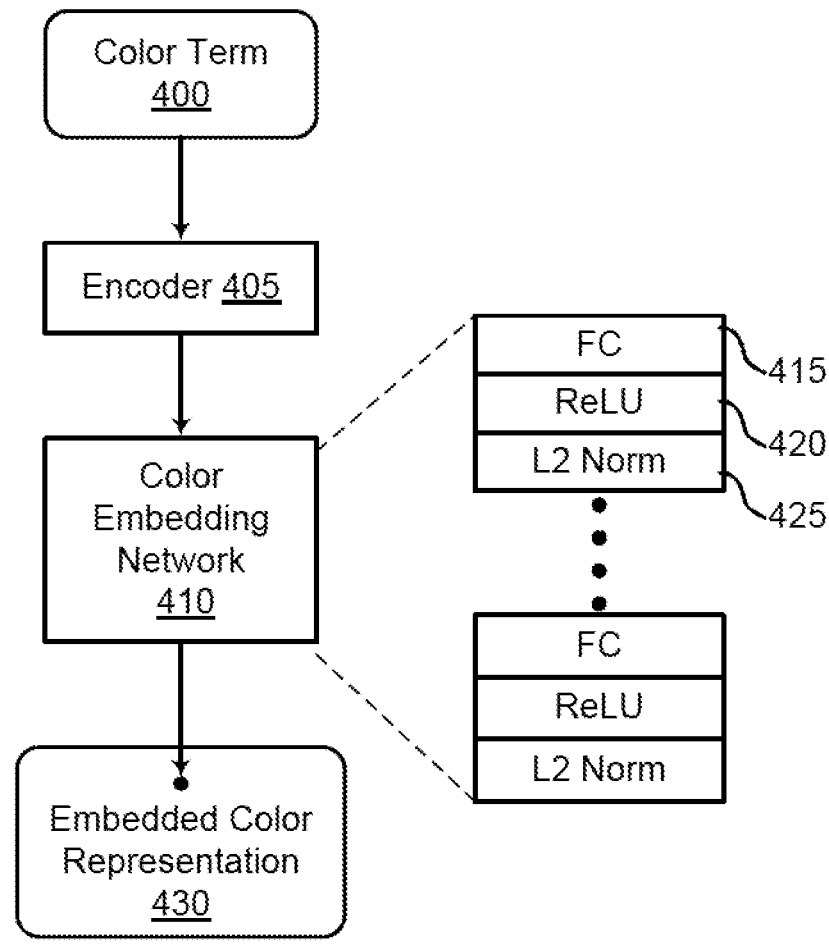
FIG. 4 shows an example of a process for color embedding according to aspects of the present disclosure.

FIG. 4 shows an example of a process for color embedding according to aspects of the present disclosure. The example shown includes color term 400, encoder 405, color embedding network 410, and embedded color representation 430. Color term 400 is an example of, or includes aspects of, the corresponding element described with reference to FIGS. 6 and 9. According to some embodiments, encoder 405 embeds the color term 400 in a text embedding space to produce an embedded color term 400. According to some embodiments, encoder 405 may be trained to embed color terms 400 in a text embedding space to generate embedded color terms 400. Encoder 405 is an example of, or includes aspects of, the corresponding element described with reference to FIGS. 6 and 9. Color embedding network 410 is an example of, or includes aspects of, the corresponding element described with reference to FIGS. 3 and 9. In one embodiment, color embedding network 410 includes fully connected layer 415, rectified linear unit 420, and least squares function 425. Embedded color representation 430 is an example of, or includes aspects of, the corresponding element described with reference to FIGS. 6 and 9.

A method for a text-based image search is described. Embodiments of the method are configured to receive a text query, wherein the text query includes a color term 400. For example, the color term 400 may be 'yellow', 'fuchsia', 'greenish-blue', or the like, but the present disclosure is not limited to these colors and may decipher various color terms 400. Additionally, the color terms 400 are not limited to the English language and may be from any natural language such as Spanish, French, Italian, or the like.

Additionally, embodiments of the method are configured to generate an embedded color representation 415 for the color term 400 using an encoder 405 and a color embedding network 410. Embodiments of the method are further configured to select a color palette for the color term 400 based on the embedded color term (e.g., the color term 400 embedded into the color space via encoder 405), perform an image search based on the color palette, and return search results based on the color palette. The search results may include an image that is determined to include the color term.

According to some embodiments, encoder 405 embeds the color term 400 in a text embedding space to produce an embedded color term. The color term 400 is first converted to a cross-lingual sentence embedding using encoder 405. For example, the encoder 405 may be a cross-lingual sentence encoder. If a cross-lingual sentence encoder is not used, another sentence encoder may be used and trained with colors in different languages. According to some embodiments, encoder 405 may be trained to embed color terms 400 in a text embedding space to generate embedded color terms.

The cross-lingual sentence embeddings are sent to the color embedding network 410, which may include blocks of fully connected (FC), ReLu, and least squares layers. Least squares layers (i.e., L2 Norm) restrict the values in such a way that the values are in a range of 0-1, and are used in the last block as the color embedding values are in the range of 0-1. In some examples, a fully connected layer 415 (FC), a rectified linear unit 420 (ReLU), and a least squares function 425 (L2 Norm) may be referred to as a neural network layer. Generally, color embedding network 410 can include any number of layers (e.g., any number of groupings of fully connected layer 415, rectified linear unit 420, and least squares function 425).

In an example scenario, embodiments of the present disclosure convert an RGB value to a corresponding 1504 dimension color embedding, and 2 non-zeros values are determined in the feature vector because one value in both of the color histograms of size 504 and 1000 are non-zero. The embedded color representation 430 may be in LAB space. LAB space is a color representation including lightness, red, green, blue, and yellow. LAB space may be used for detecting minute changes or differences in colors.

Figure 5:
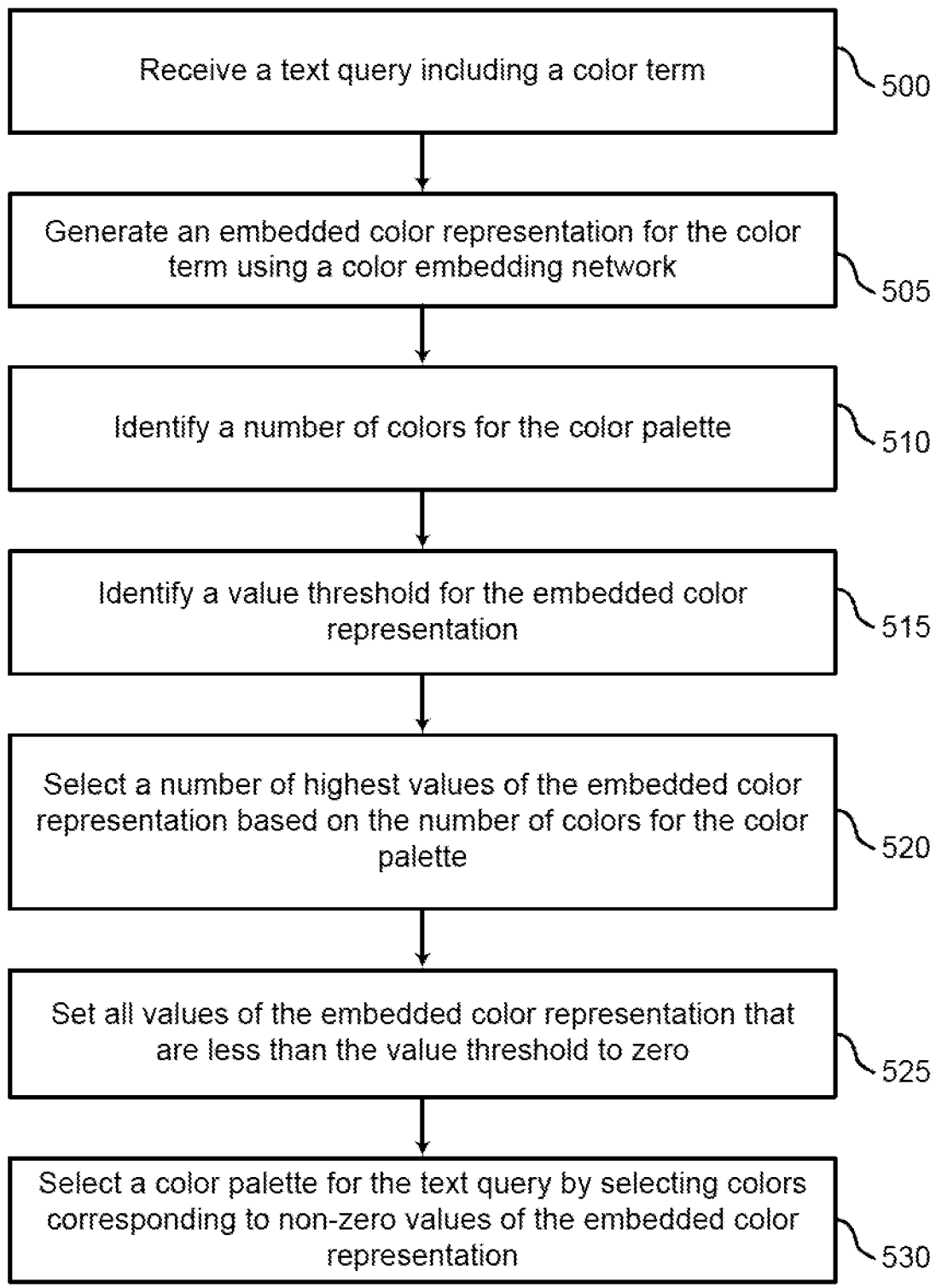
FIG. 5 shows an example of a process for selecting a color palette according to aspects of the present disclosure.

FIG. 5 shows an example of a process for selecting a color palette according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 500, the system receives a text query including a color term. In some cases, the operations of this step refer to, or may be performed by, a search interface as described with reference to FIG. 3.

At operation 505, the system generates an embedded color representation for the color term using a color embedding network, where individual values of the embedded color representation correspond to one or more colors in a color space. In some cases, the operations of this step refer to, or may be performed by, a text encoder as described with reference to FIG. 3.

At operation 510, the system identifies a number of colors for the color palette. In some cases, the operations of this step refer to, or may be performed by, a color embedding network as described with reference to FIGS. 3, 4, and 9.

At operation 515, the system identifies a value threshold for the embedded color representation. In some cases, the value threshold may be identified based on the number of colors for the color palette (e.g., based on a value threshold that results in selection of the number of colors for the color palette identified at operation 510). In some cases, the operations of this step refer to, or may be performed by, a color embedding network as described with reference to FIGS. 3, 4, and 9.

At operation 520, the system selects a number of highest values of the embedded color representation based on (e.g., less than or equal to) the number of colors for the color palette. In some cases, the operations of this step refer to, or may be performed by, a color embedding network as described with reference to FIGS. 3, 4, and 9.

At operation 525, the system sets all values of the embedded color representation that are less than the value threshold to zero (e.g., where the number of colors for the color palette is less than or equal to a number of non-zero values of the embedded color representation). In some cases, the operations of this step refer to, or may be performed by, a color embedding network as described with reference to FIGS. 3, 4, and 9.

At operation 530, the system selects a color palette for the text query by selecting colors corresponding to non-zero values of the embedded color representation. In some cases, the operations of this step refer to, or may be performed by, a palette selector as described with reference to FIG. 3.

Figure 6:
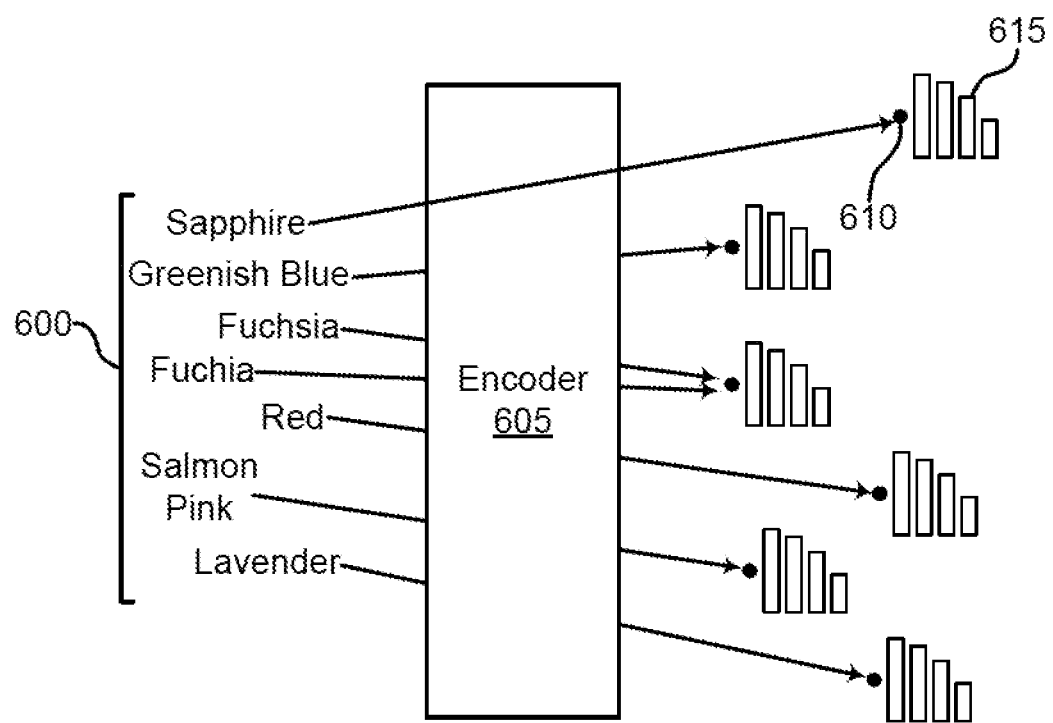
FIG. 6 shows an example of figure description according to aspects of the present disclosure.

FIG. 6 shows an example of figure description according to aspects of the present disclosure. The example shown includes color term 600, encoder 605, embedded color representation 610, and color palette 615. Color term 600 is an example of, or includes aspects of, the corresponding element described with reference to FIGS. 4 and 9. Encoder 605 is an example of, or includes aspects of, the corresponding element described with reference to FIGS. 4 and 9. Embedded color representation 610 is an example of, or includes aspects of, the corresponding element described with reference to FIGS. 4 and 9.

In some examples, the color term comprises a base color and a color modifier. If the query includes the word "and", the user may be inquiring about images with multiple independent colors. Therefore, the color terms are tokenized, and color embeddings are determined separately and summed. The color term may be 'yellow', 'fuchsia', 'greenish-blue', or the like, but the present disclosure is not limited to these colors and may decipher any color term. Additionally, the color terms are not limited to the English language and may be from any natural language such as Spanish, French, Italian, or the like.

The system of the present disclosure may generate color palettes 615 for rarely used and complex colors, colors with misspellings, and color term in different languages. As shown in FIG. 6, the word "fuchsia" is misspelled as "fuchia". The present disclosure can handle misspellings, as the misspelled word may be very near to the actual color in the cross-lingual word embedding space and therefore the color palette that is generated will be very similar.

The color palette 615 may be in RGB. In some examples, the non-zero values in the embedded color representation 610 may be converted to a corresponding RGB. The embedded color representation 610 may be based on histogram, where several colors may map to an element in the embedded color representation 610. An average color corresponding to each element may be determined to visualize the elements in the embedded color representation 610, resulting one color for each element in the embedded color representation 610. In some cases, the embedded color representation 610 includes values corresponding to two histogram vectors. The two histograms have bin sizes correspond to the granularity of the color space. The more bins in the histogram, the higher is the granularity.

Figure 7:
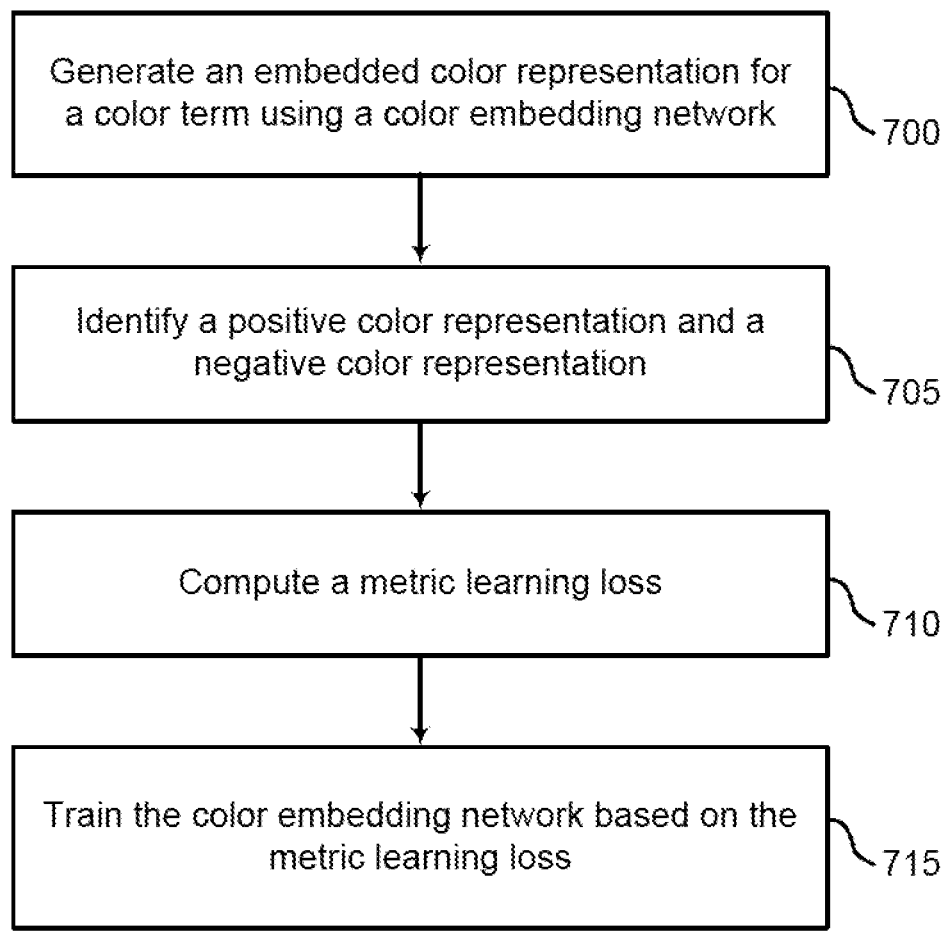
FIGS. 7 through 8 show examples of a process to train the color embedding network according to aspects of the present disclosure.

FIG. 7 shows an example of a process to train the color embedding network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

A method for training a neural network is described. Embodiments of the method are configured to generate an embedded color representation for a color term using a color embedding network, where individual values of the embedded color representation correspond to one or more colors in a color space, and identify a positive color representation corresponding to the color term and a negative color representation that does not correspond to the color term. Embodiments of the method are further configured to compute a metric learning loss based on the embedded color representation, the positive color representation, and the negative color representation, and train the color embedding network based on the metric learning loss.

At operation 700, the system generates an embedded color representation for a color term using a color embedding network, where individual values of the embedded color representation correspond to one or more colors in a color space. In some cases, the operations of this step refer to, or may be performed by, a training component as described with reference to FIG. 3.

At operation 705, the system identifies a positive color representation corresponding to the color term and a negative color representation that does not correspond to the color term. In some cases, the operations of this step refer to, or may be performed by, a training component as described with reference to FIG. 3.

At operation 710, the system computes a metric learning loss based on the embedded color representation, the positive color representation, and the negative color representation. In some cases, the operations of this step refer to, or may be performed by, a training component as described with reference to FIG. 3.

At operation 715, the system trains the color embedding network based on the metric learning loss. In some cases, the operations of this step refer to, or may be performed by, a training component as described with reference to FIG. 3.

An apparatus for a text-based image search is described. The apparatus includes a processor, memory in electronic communication with the processor, and instructions stored in the memory. The instructions are operable to cause the processor to generate an embedded color representation for a color term using a color embedding network, wherein individual values of the embedded color representation correspond to one or more colors in a color space, identify a positive color representation corresponding to the color term and a negative color representation that does not correspond to the color term, compute a metric learning loss based on the embedded color representation, the positive color representation, and the negative color representation, and train the color embedding network based on the metric learning loss.

A non-transitory computer readable medium storing code for a text-based image search is described. In some examples, the code comprises instructions executable by a processor to: generate an embedded color representation for a color term using a color embedding network, wherein individual values of the embedded color representation correspond to one or more colors in a color space, identify a positive color representation corresponding to the color term and a negative color representation that does not correspond to the color term, compute a metric learning loss based on the embedded color representation, the positive color representation, and the negative color representation, and train the color embedding network based on the metric learning loss.

A system for a text to color palette generator is described. Embodiments of the system are configured to generate an embedded color representation for a color term using a color embedding network, wherein individual values of the embedded color representation correspond to one or more colors in a color space, identify a positive color representation corresponding to the color term and a negative color representation that does not correspond to the color term, compute a metric learning loss based on the embedded color representation, the positive color representation, and the negative color representation, and train the color embedding network based on the metric learning loss. In some examples, the metric learning loss comprises a positive aware triplet ranking loss.

Figure 8:
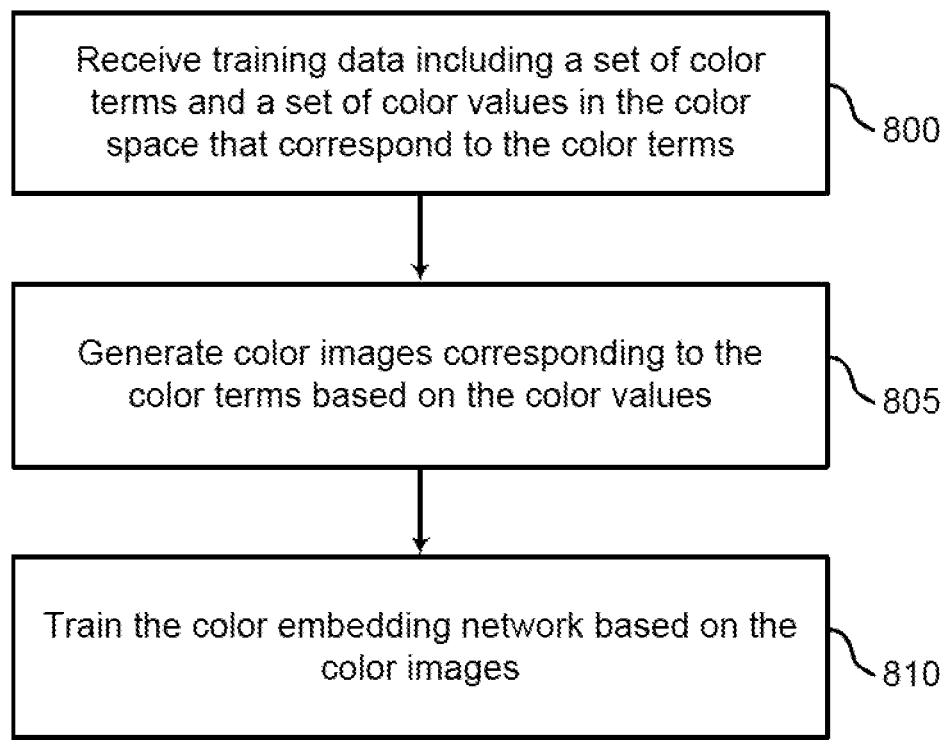

FIG. 8 shows an example of a process to train the color embedding network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Some examples of the method, apparatus, non-transitory computer readable medium, and system described above (e.g., with reference to FIG. 7) further include receiving training data comprising a plurality of color terms and a plurality of color values in the color space that correspond to the color terms. Some examples further include generating color images corresponding to the color terms based on the color values, wherein the color embedding network is trained based on the color images.

For instance, the XKCD color dataset can be used to generate images to train a neural network. In this dataset there are ~3M samples with pairs of color text with its corresponding RGB value. Instead of taking the RGB value as a color space, techniques described herein can be implemented to convert the RGB value into a 1504 dimension color embedding. Such color images may be used to train the neural network.

At operation 800, the system receives training data including a set of color terms and a set of color values in the color space that correspond to the color terms. In some cases, the operations of this step refer to, or may be performed by, a training component as described with reference to FIG. 3.

At operation 805, the system generates color images corresponding to the color terms based on the color values. In some cases, the operations of this step refer to, or may be performed by, a training component as described with reference to FIG. 3.

At operation 810, the system trains the color embedding network based on the color images. In some cases, the operations of this step refer to, or may be performed by, a training component as described with reference to FIG. 3.

Figure 9:
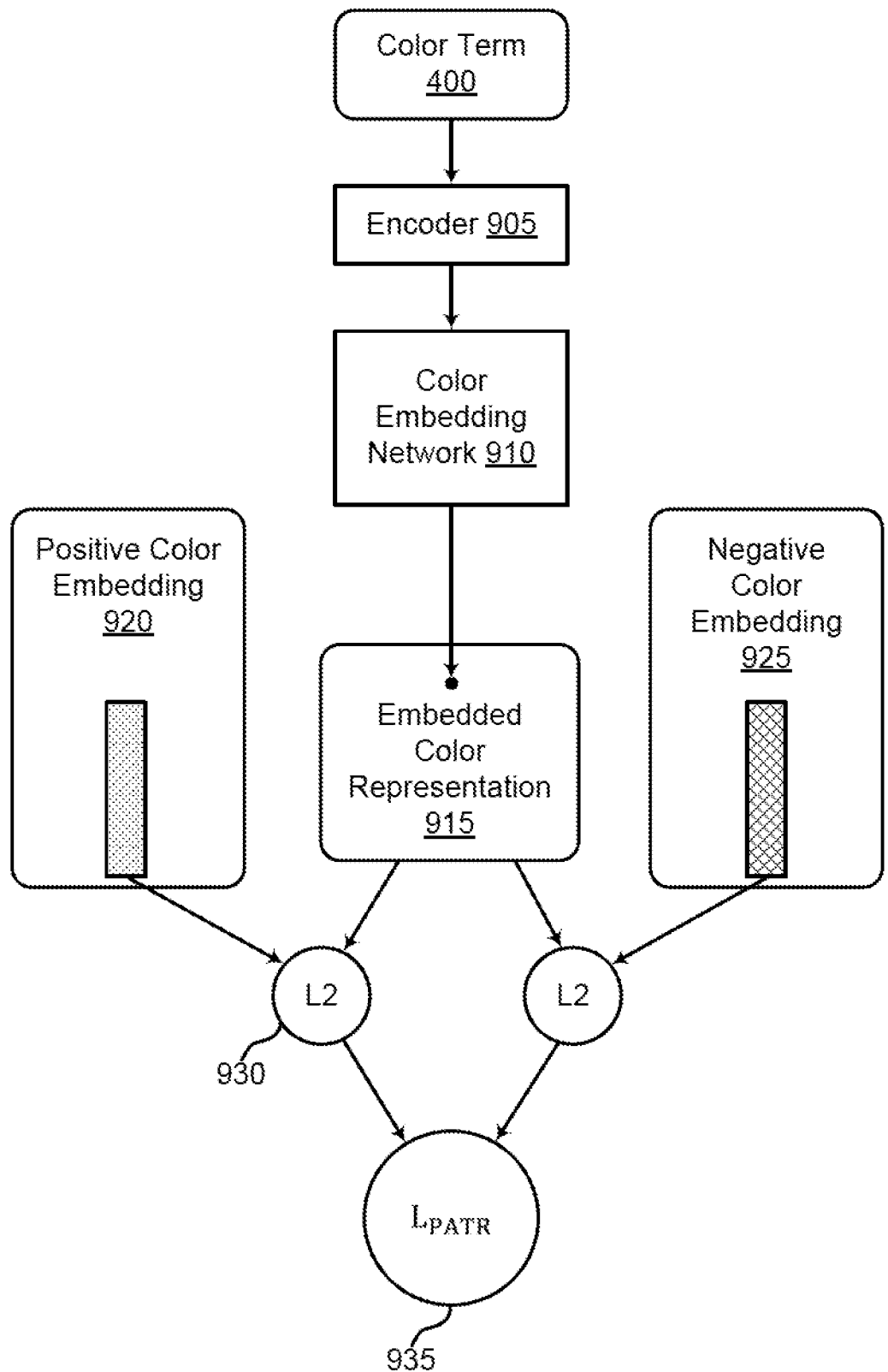
FIG. 9 shows an example of a diagram for training a color palette generator according to aspects of the present disclosure.

FIG. 9 shows an example of a diagram for training a color palette generator according to aspects of the present disclosure. The example shown includes color term 900, encoder 905, color embedding network 910, embedded color representation 915, positive color embedding 920, negative color embedding 925, least squares 930, and positive aware triplet ranking loss 935. Color term 900 is an example of, or includes aspects of, the corresponding element described with reference to FIGS. 4 and 6. Encoder 905 is an example of, or includes aspects of, the corresponding element described with reference to FIGS. 4 and 6. Color embedding network 910 is an example of, or includes aspects of, the corresponding element described with reference to FIGS. 3 and 4. Embedded color representation 915 is an example of, or includes aspects of, the corresponding element described with reference to FIGS. 4 and 6.

In some examples, the color palette generator uses a negative mining strategy, where negative samples are determined for each sample in a mini-batch. The negative mining strategy finds a sample in the mini-batch that includes a color embedding similar to the color embedding of the sample used to determine the negative sample. Additionally, or alternatively, techniques may be implemented such that the color term of both the samples are not exactly same. Therefore, hard negatives are determined using the negative mining strategy.

A metric learning loss is then used to determine the generated color embedding similar to a corresponding positive color embedding and push it away from the negative color embedding. The metric learning loss used may be referred to as Positive Aware Triplet Ranking Loss (PATR). However, PATR can be replaced to be any other metric learning loss.

$$L_{PATR}=d(te_{an},im_p)+\max(0,\eta-d(te_{an},im_p)) \quad (1)$$

In equation 1, η penalizes the distance between anchor and negative image, therefore controlling the tightness of the clusters.

With reference to the embedded color representation 915, an image in RGB space is converted to LAB space to compute the color embeddings (e.g., embedded color representation 915). If two color vectors in the RGB space are similar to each other, the two colors are not necessarily perceptively similar with respect to human color vision.

The LAB space is perceptually uniform with respect to human color vision, meaning a similar amount of numerical change in these values corresponds to a similar amount of visually perceived change. Therefore, 3D histograms may be used in LAB space. Intervals may be determined to compute histograms. A combination of histograms of, for example, sizes [9, 7, 8] and [10, 10, 10] may be used. Histograms may be calculated using [9, 7, 8] and [10, 10, 10] intervals and may be concatenated to determine a feature vector. The square root of each number in the feature vector is then determined to provide a final color embedding. Using the square root can penalize the dominant color and provide other colors in the image with more weights.

Embodiments of the present disclosure search for a specific object and a specific color (for example 'blue door' or 'green background'). Objects in an image and a background are segmented using an internal deep learning model producing pairs of mask-tags for the objects and the background. The masks may be used to compute color embeddings. Finally, the embeddings and associated tags are stored in a storage to be used for the search.

The values in the generated color embedding (palette) below a cut-off threshold are set to 0. The first k values may be determined to be non-zeros values in the color embedding and the other values (e.g., the values after the first k values) may be 0. These changes remove less significant colors from the palette.

During training, positive color embedding 920 corresponding to a positive color RGB and negative color embedding 925 corresponding to a negative color RGB may be selected. Each of the color embeddings may correspond to two color histograms, e.g., for a total embedding size of 1504 dimensions. Metric learning may be used to reduce the distance between the generated color embedding of the color text and the positive RGB color embedding, and increase the distance with the negative one in the color embedding space In some cases, a square root function is also performed on the values to avoid some colors from dominating other colors.

To use the generated color embedding (palette) to find images with similar color palettes, embodiments of the present disclosure attempt to match the generated text color palette to the indexed image color palettes using square distance and sort the images based on least distance. If the number of images in the search space is large, an elastic search system may be used to increase the speed of search. Images can be converted to a corresponding color palette by first converting the pixels into a corresponding LAB space and then using the histogram approach mentioned above to convert into the 1504 sized color embedding. These color embeddings (palettes) are indexed for the images in the search space. Depending on the application, color embeddings (palettes) corresponding to the entire image, background of the images, or foreground of the images during search may be used.

If the user searches for an object along with the color, the backend can also include a reranking of the results based on the object text present in the image tags.

To visualize the color palette in RGB, the non-zero values in the color embedding may be converted to a corresponding RGB. The color embedding is based on histograms, where several colors may map to an element in the color embedding. An average color corresponding to each element may be determined to visualize the elements in the color embedding, resulting one color for each element in the color embedding.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

Connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
receiving a text query including a color term;
encoding, by a text encoder, the color term to obtain an embedded color term in a text embedding space;
converting, by a color embedding network, the embedded color term from the text embedding space into an embedded color representation in a color embedding space, wherein the embedded color representation includes a plurality of individual values corresponding to binned regions of a perceptually uniform color space, respectively, and wherein the color embedding network is trained to generate the embedded color representation using training data including color images having a single color per training image and color text corresponding to the color images, respectively;
identifying a subset of the plurality of individual values of the embedded color representation by comparing the plurality of individual values to a value threshold; and
generating a color palette for the text query representing the color term by selecting a plurality of colors corresponding to the subset of the plurality of individual values of the embedded color representation.

2. The method of claim 1, further comprising:
identifying a number of colors for the color palette; and
selecting a number of highest values of the embedded color representation less than or equal to the number of colors for the color palette, wherein the subset is selected based on the selected number of highest values.

3. The method of claim 2, further comprising:
identifying the value threshold for the embedded color representation; and
setting all values of the embedded color representation that are less than the value threshold to zero, wherein the number of colors for the color palette is less than or equal to a number of non-zero values of the embedded color representation.

4. The method of claim 1, further comprising:
identifying a first portion of the embedded color representation corresponding to a first color bin size;
identifying a second portion of the embedded color representation corresponding to a second color bin size; and
normalizing the first portion and the second portion independently.

5. The method of claim 1, further comprising:
identifying an additional color term in the text query; and
generating an additional embedded color representation for the additional color term, wherein the color palette is selected based on the embedded color representation and the additional embedded color representation.

6. The method of claim 1, further comprising:
performing an image search based on the color palette.

7. The method of claim 6, further comprising:
determining that the color term is directed to a foreground or a background, wherein the image search is based on the determination.

8. The method of claim 7, further comprising:
generating a mask for the foreground or the background based on the determination, wherein the image search is based on the mask.

9. The method of claim 7, further comprising:
identifying an additional color term in the text query, wherein the color term is directed to the foreground and the additional color term is directed to the background, and wherein the image search is directed to images having colors from the color palette in the foreground and colors corresponding to the additional color term in the background.

10. The method of claim 1, further comprising:
converting the embedded color term into the color embedding space to produce the embedded color representation.

11. The method of claim 1, wherein:
the color term comprises a base color and a color modifier.

12. An apparatus comprising:
a text encoder trained to embed color terms in a text embedding space to generate embedded color terms;
a color embedding network trained to convert the embedded color terms from the text embedding space into embedded color representations in a color embedding space, wherein the embedded color representations include a plurality of individual values of the embedded color representations corresponding to binned regions of a perceptually uniform color space, respectively, and wherein the color embedding network is trained to generate the embedded color representation using training data including color images having a single color per training image and color text corresponding to the color images, respectively; and
a palette selector configured to generate a color palette representing the color terms by selecting a plurality of colors corresponding to a subset of the plurality of individual values of the embedded color representations, wherein the subset of the plurality of individual values of the embedded color representations are identified by comparing the plurality of individual values to a value threshold.

13. The apparatus of claim 12, further comprising:
a search component configured to perform an image search based on the color palette.

14. The apparatus of claim 13, further comprising:
a database comprising a plurality of images indexed for the image search.

15. The apparatus of claim 13, further comprising:
a search interface configured to receive a text query from a user and display search results based on the image search.

16. The apparatus of claim 12, further comprising:
a training component configured to train the color embedding network using single color image files associated with the color terms.

17. The apparatus of claim 12, wherein:
the color embedding network comprises a fully connected layer, a ReLU layer, and an L2 normalization layer.

18. A method of training a neural network, the method comprising:
encoding, by a text encoder, a color term to obtain an embedded color term in a text embedding space;
converting, by a text embedding network, the embedded color term from the text embedding space into an embedded color representation in a color embedding space, wherein the embedded color representation includes a plurality of corresponding to binned regions of a perceptually uniform color space, respectively;
identifying a positive color representation corresponding to the color term and a negative color representation that does not correspond to the color term;
computing a metric learning loss based on the embedded color representation, the positive color representation, and the negative color representation; and
training a color embedding network based on the metric learning loss, wherein the color embedding network is trained to generate the embedded color representation using training data including color images having a single color per training image and color text corresponding to the color images, respectively.

19. The method of claim 18, wherein:
the metric learning loss comprises a positive aware triplet ranking loss.

20. The method of claim 18, further comprising:
receiving training data comprising a plurality of color terms and a plurality of color values in the perceptually uniform color space that correspond to the plurality of color terms; and
generating color images corresponding to the plurality of color terms based on the plurality of color values, wherein the color embedding network is trained based on the color images.

* * * * *